United States Patent [19]

Gabriele

[11] Patent Number: 4,799,690
[45] Date of Patent: Jan. 24, 1989

[54] SANITARY SHAFT SEAL ASSEMBLY
[75] Inventor: Valentino Gabriele, Baltimore, Md.
[73] Assignee: J. C. Pardo and Sons, Baltimore, Md.
[21] Appl. No.: 172,555
[22] Filed: Mar. 24, 1988
[51] Int. Cl.⁴ ............................................. F16J 15/54
[52] U.S. Cl. ...................................... 277/9; 277/131; 277/166; 277/181
[58] Field of Search ................ 277/166, DIG. 8, 130, 277/131, 48, 47, 49, 50, 187, 181, 182, 183, 184, 136, 9, 9.5, 10, 11, 192, 193, 195; 384/436, 437, 439, 152

[56] References Cited

U.S. PATENT DOCUMENTS

| | | | |
|---|---|---|---|
| 2,573,504 | 10/1951 | Solie | 277/10 |
| 3,285,614 | 11/1966 | McClenathan | 277/DIG. 8 |
| 3,393,916 | 7/1968 | Askew | 277/136 |

Primary Examiner—William A. Cuchlinski, Jr.
Assistant Examiner—Petar Arsenovic
Attorney, Agent, or Firm—Kenneth E. Darnell

[57] ABSTRACT

A sanitary seal assembly useful for sealing a rotary through-wall shaft in both static and rotary modes, the invention provides a sealing structure capable of being fitted to external wall surfaces of a cooking kettle or the like for rapid manual assembly and disassembly for cleaning according to sanitation standards. The sealing assembly includes a seal retainer having static and rotary sealing elements, the seal retainer being held in place by compression forces exerted by a pivotable seal compression element. The seal compression element is pivotable at one end to release pressure on the seal retainer to allow removal of the retainer for cleaning of the seal assembly.

6 Claims, 3 Drawing Sheets

SANITARY SHAFT SEAL ASSEMBLY

BACKGROUND OF THE INVENTION

1. Field of the Invention

The invention relates generally to a seal assembly capable of sealing a through-wall shaft in both static and rotary modes and particularly relates to such a seal assembly which can be rapidly assembled and disassembled without the use of tools to allow cleaning.

2. Description of the Prior Art

The prior art is replete with seal structure capable of sealing a through-wall rotary shaft. Such prior seal structure takes a wide variety of forms which in most applications do not require the ability to disassemble the seal without the use of tools so that the seal structure can be subjected to cleaning on a regular basis. In the food processing arts, structure contacting foodstuffs during processing must be cleaned daily in order to meet sanitation standards. Where at all possible, food processing structure must be capable of disassembly without the use of special tools. Further, it is necessary from a practical standpoint to cause such food processing structure to be easily and rapidly assembled and disassembled so that daily cleaning of such structure does not become an onorus burden with the attendant possibility that cleaning of the structure will be haphazardly attended to.

The particular background of the present invention relates to cooking kettles having agitator structure rotatable therewithin to process food materials which are heated or cooked within the kettle. An example of such a kettle and agitator assembly is provided in U.S. Pat. No. 4,571,091 to Pardo et al. Numerous other examples of kettle/agitator arrangements exist in the art, these structures generally being provided with a rotary shaft which extends through a wall of the kettle, it being necessary to seal the kettle at the opening through which the shaft of the agitator extends. In this use environment, and especially with kettles of a size of approximately 80 gallons or more, it is difficult for an operator to gain ready access to the interior of a kettle for removal of sealing structure disposed primarily within the interior of the kettle such that said sealing structure must be removed with access to the interior of the kettle. In such situations, it is virtually a necessity to provide sealing structure exteriorly of the kettle and which can be disassembled, preferably without the use of tools, in a rapid and ready fashion such that the sealing structure can be easily cleaned.

Prior patents which disclose structure useful in the sealing of a rotary shaft include U.S. Pat. No. 2,635,931 to May who provides an "O"-ring seal capable of sealing a rotary joint in a rotary mode. Steidel, in U.S. Pat. No. 3,382,015, describes a bearing which has some sealing capability, the bearing using a spring clip and holder to retain a bearing in position. In U.S. Pat. No. 3,584,923, Goossens describes a bearing device including a slotted end plate, slotted bearing and spring-like wedge which, while primarily serving as a bearing, provides some sealing function. Dubay, in U.S. Pat. No. 3,751,122, discloses a bushing for a sanitary conveyor, which bushing accepts and at least partially seals a shaft. Wilczewski, in U.S. Pat. No. 4,502,796, discloses a bearing for a rotary shaft, the bearing being sectional in nature and having a retaining clip positioned to release bearing sections on removal of the clip.

The prior art noted above generally discloses "O"-ring seals associated with bearing-like elements and wherein at least some of the structures are held together by C-shaped clips and similar structure to allow disassembly of the bearing structures.

As evidenced by the foregoing patents and that prior art known to the applicant, the prior art does not envision a sanitary sealing assembly capable of sealing a rotary shaft in both static and rotary modes and which can be rapidly and readily assembled and disassembled to allow cleaning according to sanitation standards and preferably without the use of tools. Further, the present invention provides relatively simple and inexpensive structure capable of being mounted directly to external surfaces of a cooking kettle or similar structure having a wall through which a rotary shaft extends, the present sealing assembly acting to efficiently seal the shaft yet be readily removable within a very short period of time and with a minimum of physical effort.

SUMMARY OF THE INVENTION

The present invention provides embodiments of a shaft seal assembly useful particularly in the food processing industry to seal a through-wall shaft such as an agitator shaft extending through the wall of a cooking kettle or similar processing structure. In a first embodiment, the present sealing assembly includes a seal retainer having static and rotary sealing elements and wherein the seal retainer is held in place by compression forces exerted by a pivotable seal compression element. The seal compression element is pivotable at one end to release pressure on the seal retainer to allow removal of the retainer for cleaning of the seal assembly.

In a second embodiment of the invention, a seal retainer is also provided with static and rotary sealing elements comprising separate O-ring structures, the seal retainer being capable of disassembly by lateral sliding thereof either toward or away from the interior of a wall, such as a kettle wall, having an opening which is sealed by the present seal assembly. The seal retainer of the second embodiment is retained in position by a retainer gate structure which is manually removed from the seal assembly to allow removal of the seal retainer.

Accordingly, it is an object of the present invention to provide a sanitary seal assembly capable of sealing a rotary through-wall shaft in both static and rotary modes and which is readily and rapidly assembled and disassembled to allow cleaning of the seal assembly.

It is another object of the present invention to provide a sanitary seal assembly capable of sealing a rotary shaft extending through a wall of a cooking kettle or similar structure, the seal assembly being capable of removal from a position external of the kettle and without the need for tools, thereby facilitating cleaning of the seal assembly and kettle wall opening.

Further objects and advantages of the invention will become more readily apparent in light of the following detailed description of the preferred embodiments.

DESCRIPTION OF THE PREFERRED EMBODIMENTS

Figure 1:
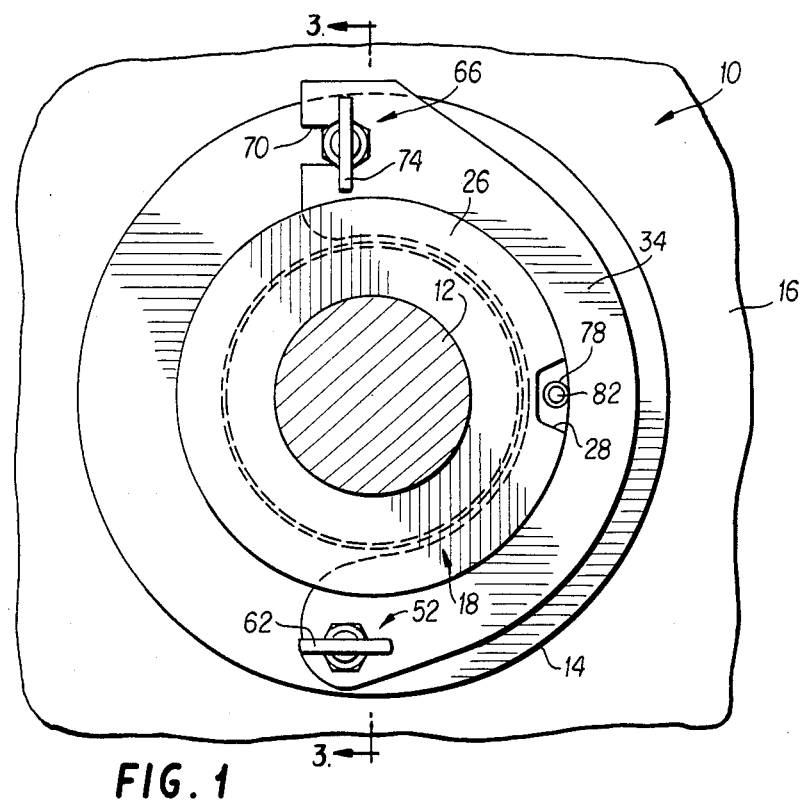
FIG. 1 is a frontal view of a first embodiment of the present seal assembly mounted in an opening in a kettle wall through which a rotary shaft extends, the seal assembly being disposed in an assembled configuration within said opening and about said shaft for sealing said opening and shaft.

Referring now to the drawings and particularly to FIGS. 1 through 4, a first embodiment of the invention is referred to as seal assembly 10 and is shown for purposes of illustration as sealing shaft 12 extending through opening 14 in kettle wall 16. The shaft assembly 10 is capable of sealing a rotary shaft within an environment such as is described in U.S. Pat. No. 4,571,091 to Pardo et al; and U.S. Pat. No. 4,199,266 to Giusti; or in U.S. patent application Ser. No. 907,001 filed Sept. 15, 1986 by Pardo et al, the disclosures of these patents and patent application being incorporated hereinto by reference. It is to be understood that the present seal assemblies can be utilized in association with other structure. However, the use of the present seal assemblies find particular utility in association with the structures of the aforesaid patents and patent application.

Figure 4:
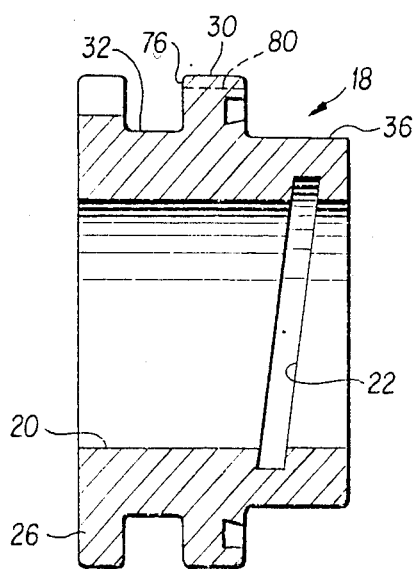
FIG. 4 is a side elevational view in section of a seal retainer according to the first embodiment of the invention.

The shaft 12 extends through the opening 14 and is surrounded by a seal retainer 18 which is shown in detail in FIG. 4. The seal retainer is substantially annular in conformation and has central bore 20 formed therethrough, the shaft 12 extending through the bore 20 and fitting therewithin with sufficient clearance to allow rotation of said shaft 12 within said bore. The seal retainer 18 is provided with an angularly offset seal race 22 which receives rotary shaft seal 24 therewithin. The rotary shaft seal 24 essentially comprises an "O"-ring seal element formed of a silicone material such as is well known in the art. The seal 24 acts to seal the shaft 12 during rotation of the shaft. The seal race 22 is angularly offset in order to distribute the wear surface more evenly on the shaft 12 and thereby extend the life of the seal 24.

The seal retainer 18 is provided with an external annular flange 26 which has a cutout portion 28 as seen particularly in FIGS. 1 and 2, the function of the cutout portion 28 being described hereinafter. The seal retainer 18 further has an interior annular flange 30 spaced inwardly of the flange 26, the flanges 26 and 30 defining an annular groove 32 therebetween, at least portions of the groove 32 receiving a substantially C-shaped seal compression element 34 therewithin on assembly of the seal assembly 10 in a use environment. The full function of the seal compression element 34 will be described further hereinafter.

The seal retainer 18 terminates inwardly in annular shoulder portion 36 which is received within central bore 38 of seal support ring 40, the seal support ring 40 being flushly received within the opening 14 in the kettle wall 16. From a practical standpoint, the seal support ring 40 will be welded within the opening 14 such that the seal support ring 40 essentially becomes an integral part of the kettle wall 16. As is particularly seen in FIG. 3, the annular shoulder portion 36 of the seal retainer 18 fits flushly within the bore 38 of the ring 40 with rear flange face 42 of the interior flange 30 abutting the outer face of the ring 40 about the periphery of the bore 38. The rear flange face 42 of the seal retainer 18 is provided with an annular seal race 44 for receiving seal 46 therewithin, the seal 46 comprising an "O"-ring element which acts as a static seal. The seal 46 is formed of any suitable material and preferably is formed of Buna-N. It is to be understood that the seal race 44 is preferably circular in conformation and opposes the outer face of the support ring 40 such that the seal 46 seals against said face of said ring 40. The seal race 44 is preferably provided with an inner wall 48 which is angled relative to outer wall 50 of the race 44, thereby facilitating the retention of the seal 46 within said race 44.

Figure 2:
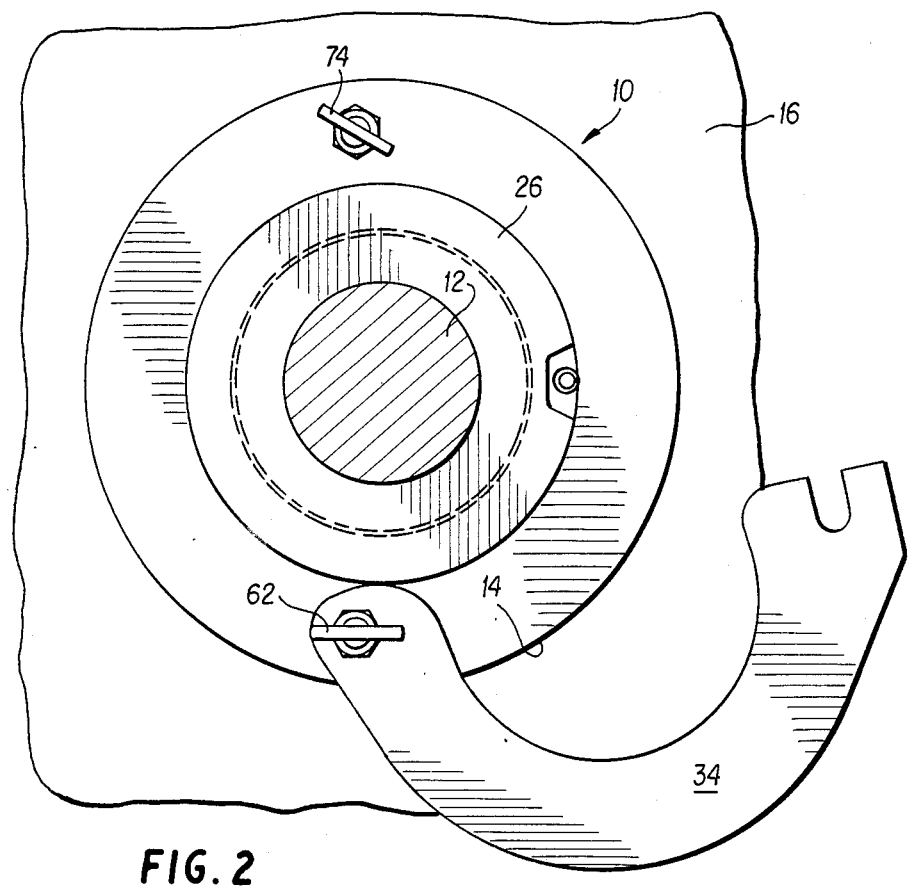
FIG. 2 is a frontal view of the first embodiment of the present seal assembly illustrating pivotal movement of portions of the seal assembly to a non-blocking position to allow removal of those portions of the seal assembly lying along the shaft.
Figure 3:
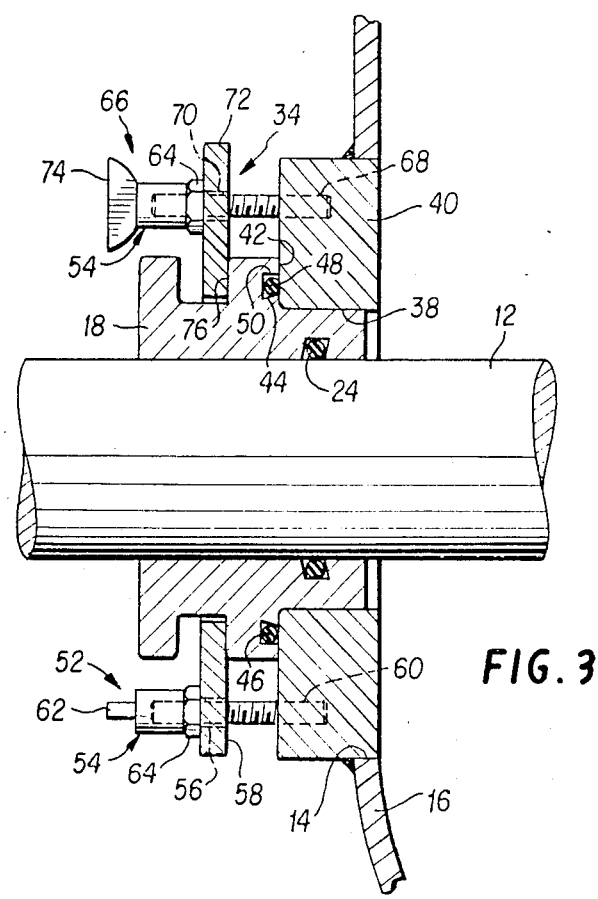
FIG. 3 is a section taken along line 3—3 of FIG. 1.

As particularly noted in FIGS. 1 through 3, the seal compression element 34 is pivotally movable about bolt assembly 52, the bolt 54 of said assembly 52 being received within an aperture 56 formed at end 58 of said element 34. The bolt 54 is threaded at its anterior end and is received within threaded bore 60 formed in the support ring 40. The distal end of the bolt assembly 52 comprises a wing nut 62 which is threadably fitted on the bolt 54 and spaced from the compression element 34 by means of hex nut 64. The wing nut 62 can therefore be manually manipulated in order to tighten the bolt assembly 52 and cause the compression element 34 to bias the seal retainer 18 inwardly. In a similar manner, a bolt assembly 66 which is substantially identical to the bolt assembly 52 is mounted to the support ring 40 within a threaded bore 68, the bolt assembly 66 being received within an open slot 70 formed in end 72 of the compression element 34. Manual manipulation of wing nut 74 similarly compresses the compression element 34 against the seal retainer 18 and causes the compression element 34 to bias against at least portions of front flange face 76 of the interior flange 30. The seal compression element 34 thereby holds the seal retainer 18 in compression against the seal support ring 40 and thus maintains the seal assembly in an assembled configuration as is shown in FIG. 1 about the shaft 12.

As is best seen in FIG. 1, an aperture 78 is formed within the seal compression element 34 substantially medially of its arc and near its inner edge at a location which aligns with the cutout portion 28 formed in the external flange 26 of the seal retainer 18. The aperture 78 formed in the seal compression element 34 further aligns with a bore 80 formed in the front flange face 76 of the interior flange 30 such that a pin 82 can be received through the aperture 78 in the compression element 34 and into the bore 80, thereby locking the seal compression element 34 in place as is shown in FIG. 1.

Removal of the pin 82 accompanied by release of compression of the bolt assemblies 52 and 66 on the compression element 34 by means of manipulation of the wing nuts 62 and 74, allows rotation of the seal compression element 34 about the bolt assembly 52. The open slot 70 formed in the end 72 of the compression element 34 allows the compression element 34 to pivot away from said bolt assembly 66 and to the position shown in FIG. 2 wherein the seal retainer 18 is no longer held in position. Accordingly, the seal retainer 18 as seen in FIG. 2 can manually be manipulated outwardly of the shaft 12 to slide along said shaft 12 and out of the bore 38 of the seal support ring 40. All structural elements of the seal assembly 10, with the exception of the seal support ring 40 when welded to the kettle wall 16, can thereby be removed manually for cleaning. Disassembly of the seal assembly 10 is rapidly and readily accomplished without the need for tools of any nature. The seal assembly 10 can be oriented in any desired manner about the shaft 12 since the spatial orientation of said assembly 10 is not critical to operation of the seal assembly.

The seal retainer 18 is preferably formed of a resinous polymeric material as approved by appropriate government entities, a preferred material being a homopolymer resin such as Acetal. The other elements forming the seal assembly 10, with the exception of the seals 24 and 46 as noted above, are preferably formed of 18-H stainless steel or equivalent material.

Figure 5:
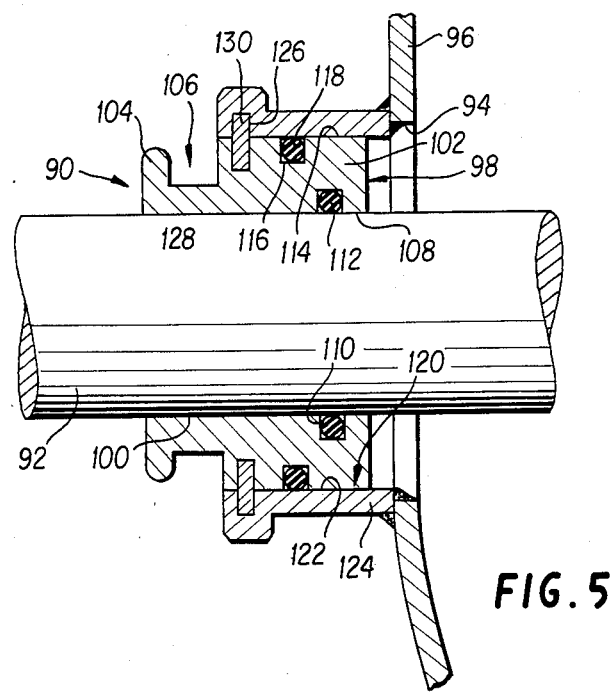
FIG. 5 is a side elevational view in section of a second embodiment of the invention in a sealing configuration disposed on a kettle wall and about a rotary shaft; and, FIG. 6 is a front elevational view of the second embodiment of the invention as shown in FIG. 5.
Figure 6:
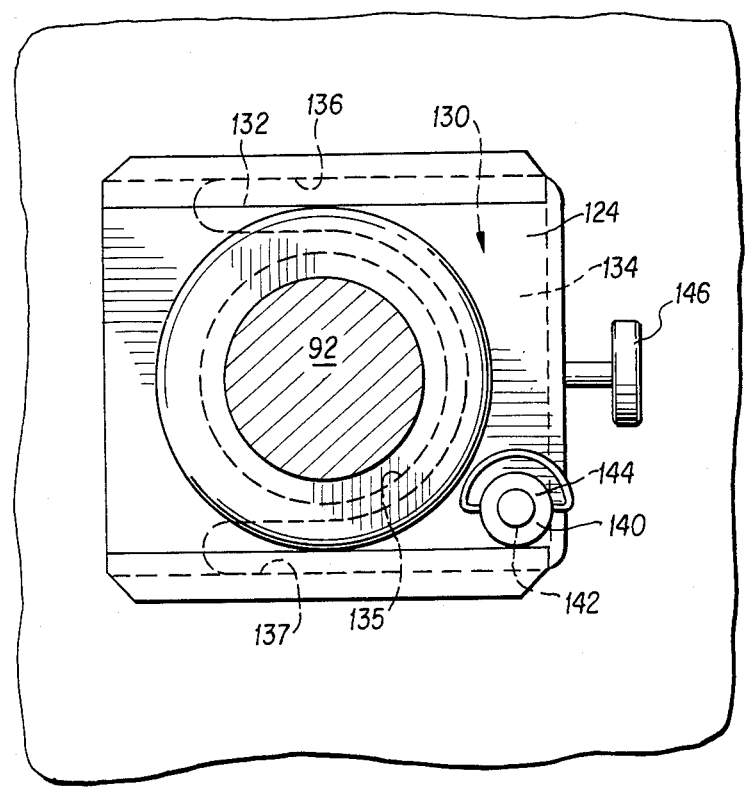

Referring now to FIGS. 5 and 6, a second embodiment of the invention is seen to provide a seal assembly 90 which acts to seal a shaft 92 extending through opening 94 in kettle wall 96. A seal retainer 98 is seen to have a central bore 100 through which the shaft 92 is received. The seal retainer 98 comprises an annular body portion 102 and an annular grip ring 104 which is separated from the body portion 102 by a reduced-in-diameter neck portion 106. An annular face 108 of the seal retainer 98 is provided with a circular groove-like seal race 110 which receives a rotary shaft seal 112 which acts to seal the shaft 92 in a rotary mode. The rotary shaft seal 112 preferably comprises an "O"-ring seal formed of a conventional elastomeric material such as is well known in the art. The seal 112 is preferably disposed nearmost the anterior end of the seal retainer 98.

External annular face 114 has a groove-like seal race 116 formed therein for receiving "O"-ring seal 118, the seal 118 sealing against inner annular surface 120 of central bore 122 formed in retainer housing 124. As best seen in FIG. 6, the retainer housing 124 is substantially rectangular in conformation. As can be seen in FIG. 5, the retainer housing 124 is welded to the kettle wall 96 and preferably forms a permanent part of the kettle wall. The retainer housing 124 is provided with a slot 126 which aligns with annular gate groove 128 formed in the external annular face 114 of the body portion 102 of the seal retainer 98, the groove 128 being disposed near the distal end of the body portion 102 and outwardly of the seal races 110 and 116. A flat, plate-like retainer gate 130 is received within the slot 126 and into at least portions of the annular gate groove 128 to hold the seal retainer 98 from movement along the shaft 92. The retainer gate 130 is provided with opposed fingers 132 which act with body portion 134 to define arcuate edge 135, the portions of the retainer gate 130 disposed about the arcuate edge 135 fitting into the groove 128. The retainer housing 124 is further provided with upper and lower gate grooves 136 and 137 which respectively receive upper and lower fingers 132 of the retainer gate 130. The upper and lower gate grooves 136 and 137 align with the annular gate groove 128 formed in the retainer gate 130.

A quick release pin 140 is received within aligned bores 142 and 144 formed respectively in the housing 124 and in the gate 130. The pin 140 prevents dislodgement of the retainer gate 130 from locking relation with the seal retainer 98.

The pin 140 can be rapidly and readily removed without the use of tools to allow the retainer gate 130 to be slid outwardly through the slot 126 to release the seal retainer 98 from engagement with the retainer housing 124. A handle 146 is provided on the outer edge of the gate 130 to facilitate manual removal of the gate 130 from the seal assembly. The seal retainer 98, once released from blocking relation with the retainer housing 124, can slide longitudinally of the shaft 92 in either direction for removal from the shaft to allow cleaning. For kettle sizes and structures which do not allow ready access to the interior of the kettle, the seal retainer 98 is preferably slid outwardly along the shaft 92 when disassembling the seal assembly 90.

The seal retainer 98 is preferably formed of a material such as Acetal and the seals 112 and 118 are preferably formed of elastomeric materials such as is described above relative to material choice for the seal retainer 18 and seals 24 and 46 of the embodiment of FIGS. 1 through 4. The retainer housing 124 and retainer gate 130 are preferably formed of stainless steel or similar material.

The concept of the invention is best configured in the embodiments described in detail hereinabove. However, it will be apparent to those skilled in the art that the inventive concept can be practiced other than as explicitly described herein. Accordingly, the scope of the invention is to be limited only by the definitions of the appended claims.

What is claimed is:

1. A seal assembly for sealing a rotary shaft extending through a wall in both static and rotary modes and being capable of rapid assembly an disassembly for cleaning with out the use of tools, comprising:

support ring means fixed to the wall and having a bore formed therein, the shaft extending through the bore in said support ring means;

seal retainer means disposed at least partially within the bore of the support ring means, the seal retainer means having a bore extending therethrough, the longitudinal axes of the bores being coincidental, the shaft extending through the bore in the seal retainer means with sufficient clearance to rotate therewithin, the seal retainer means having a first seal race formed therein and facing the shaft and a second seal race formed therein and facing the portion of the support ring means, the seal retainer means having a groove formed therein in a portion thereof disposed exteriorly of the support ring means;

first and second sealing elements disposed respectively within the first and second seal races and sealing respectively against the shaft and the support ring means;

displacement means for holding the seal retainer means relative to the support ring means and the shaft and being manually displaceable to allow manual removal of the seal retainer means from the support ring means, the displacement means comprising a substantially C-shaped seal compression element having first and second end portions, the first end portion having an open slot formed therein and the second end portion having an aperture formed therein, at least portions of inner edge portions of the seal compression element fitting into at least portions of the groove formed in the seal retainer means when the displacement means occupies a position holding the seal retainer means relative to the support ring means; and, locking means for holding the seal compression element in place relative to the seal retainer means and the support ring means, the locking means being manually separable from the displacement means, at least portions of the locking means being received in the open slot formed in the first end portion of the seal compression element, displacement of the seal compression element away from the locking means causing the locking means to be moved out of the slot, thereby freeing the seal compression element from the locking means.

2. The seal assembly of claim 1 and further comprising means for mounting the seal compression element for rotation about a pivot point to allow displacement of said seal compression element to and from a first position wherein the seal retainer means is positively held in place relative to the support ring means and the shaft and a second position wherein the seal retainer means is free to be manually removed from the support ring means.

3. The seal assembly of claim 2 wherein the seal retainer means has exterior and interior flanges formed on external surfaces thereof and disposed exteriorly of the support ring means, the flanges defining the groove, the interior flange having a front face and a rear face, the rear face having a second seal race formed therein and facing a portion of the support ring means, the inner edge portions of the seal compression element fitting into the groove when the seal compression element is in a position holding the seal retainer means relative to the support ring means, the locking means comprising a first threaded fastener extending through the slot in the first end portion of the seal compression element and being received at its anterior end for reciprocation within a threaded bore formed in the support ring means, the first fastener having means formed in the distal end thereof for manually tightening or loosening of the first threaded fastener, the mounting means comprising a second threaded fastener received within the aperture formed in the second end portion of the seal compression element, the second threaded fastener further being received at its anterior end for reciprocation within a threaded bore formed in the support ring means, the second fastener having means formed on the distal end thereof for manual tightening or loosening of the second threaded fastener, the threaded fasteners being manually tightened to bias the seal compression element against the front face of the interior flange to thereby bias the seal retainer means into sealing engagement with facing portions of the support ring means opposing rear face of interior flange, loosening of the threaded fasteners allowing pivoting of the sealed compression element out of the groove about the pivot point defined by the longitudinal axis of the second threaded fastener, the slot formed in the first end of the seal compression element allowing release from the first threaded fastener on pivotal movement of the seal compression element.

4. The seal assembly of claim 1 wherein the first seal race is oriented at an angle relative to the longitudinal axis of the shaft.

5. The seal assembly of claim 1 wherein the seal elements comprise O-ring sealing elements.

6. A seal assembly for sealing a rotary shaft extending through a wall in both static and rotary modes and being capable of rapid assembly and disassembly for cleaning without the use of tools, comprising:

housing means fixed to the wall and having a bore formed therein, the shaft extending through the bore in said housing means;

seal retainer means exposed at least partially within the bore of the housing means, the seal retainer means having a bore extending therethrough, the longitudinal axes of the bores being coincidental, the shaft extending through the bore in the seal retainer means with sufficient clearance to rotate therewithin, the seal retainer means having a first seal race formed therein and facing the shaft and a second seal race formed therein and facing a portion of the housing means;

first and second sealing elements disposed respectively within the first and second seal races and sealing respectively against the shaft and the housing means;

displacement means for holding the seal retainer means relative to the housing means and the shaft and being manually displaceable to allow manual removal of the seal retainer means from the housing means; and, locking means for holding the displacement means in place relative to the seal retainer means and the housing means, the locking means being manually separable from the displacement means, the locking means further comprising a quick-release pin mounted in aligned bores extending through the seal retainer means and the displacement means.

* * * * *